United States Patent [19]

Yamaguchi

[11] Patent Number: 4,738,410
[45] Date of Patent: Apr. 19, 1988

[54] DOUBLE BEARING TYPE FISHING REEL

[75] Inventor: Nobuyuki Yamaguchi, Tokyo, Japan

[73] Assignee: Daiwa Seiko Inc., Tokyo, Japan

[21] Appl. No.: 939,290

[22] Filed: Dec. 4, 1986

[30] Foreign Application Priority Data

Dec. 25, 1985 [JP] Japan .................. 60-201633[U]

[51] Int. Cl.$^4$ .................................................. A01K 89/02
[52] U.S. Cl. .............................. 242/217; 242/84.5 R; 242/84.5 A; 242/214; 242/218
[58] Field of Search .......................... 242/211–214, 242/216–221, 84.5 A, 84.5 R, 84.51 A

[56] References Cited

U.S. PATENT DOCUMENTS

| | | | |
|---|---|---|---|
| 3,000,477 | 9/1961 | Dunn | 242/214 |
| 3,315,913 | 4/1967 | Grieten | 242/214 |
| 3,432,114 | 3/1969 | Meisner | 242/214 |
| 4,513,925 | 4/1985 | Yamaguchi | 242/84.5 A |

Primary Examiner—John Petrakes

Attorney, Agent, or Firm—Browdy and Neimark

[57] ABSTRACT

A double bearing type fishing reel includes a spool shaft supported rotatably between opposed side members of the reel. A spool is non-rotatably mounted on the spool shaft. A locking member is mounted on one end portion of the spool shaft, which projects outward from one of the side members. A drag-operating lever is supported pivotably on a portion of the side member from which the spool shaft projects outward. A slidable member is movable on the spool shaft in the axial direction thereof in accordance with a pivotable movement of the drag-operating lever. A knob retainer member is engaged with the slidable member and adapted to operate the locking member. A pinion is mounted rotatably on the spool shaft and meshed with a driving gear mounted on a handle shaft. A drag disc adapted to be turned with the pinion and provided so as to oppose a brake member provided on a side surface of the spool. The drag on the spool can be freely adjusted, and the winding means is engaged with the spool only during winding.

1 Claim, 4 Drawing Sheets

DOUBLE BEARING TYPE FISHING REEL

BACKGROUND OF THE INVENTION

1. Field of the Invention

This invention relates to an improvement in a lever type drag mechanism for double bearing type fishing reels, in which the diameter of a fishing line-winding portion of a spool is set smaller so as to reduce the weight, simplify the construction, and improve the controllability, of the drag mechanism.

2. Description of the Prior Art

In any of the conventional lever type drag mechanisms for double bearing type fishing reels, a spool is supported rotatably via ball bearings on a spool shaft, which is formed so that the spool can be moved in the axial direction in accordance with the pivotal movement of a drag regulating lever, and a brake member fixed to the spool shaft is formed so that the brake member can be pressed against a braking portion provided on a side surface of the spool, to thereby brake the spool, as shown in the specification of U.S. Pat. No. 3,993,267.

However, in a system in which such a spool is supported on a spool shaft via ball bearings, the diameter of the fishing line-winding portion of the spool increases to a high level due to the ball bearings, so that the dimensions and weights of the spool and reel increase greatly. Moreover, the number of parts also increases, and the construction of the drag mechanism becomes complicated. In addition, the inertial force occurring when the drag is loosened to rotate the spool freely also increases to cause the casting performance of the reel to lower.

SUMMARY OF THE INVENTION

In view of these facts, the present invention has been developed so as to eliminate the drawbacks encountered in the above-described conventional lever type drag mechanism.

A first object of the present invention is to provide a double bearing type fishing reel having a lever type drag mechanism, small dimensions and weight and a large fishing line-winding capacity, which is capable of reducing the diameter of a fishing line-winding trunk portion of a spool to a low level by mounting the spool on a spool shaft without using ball bearings, in such a manner that the spool cannot be rotated, whereby an increase, which constitutes a fault of a conventional reel of this kind, in the dimensions and weights of the spool and reel can be prevented.

A second object of the present invention is to provide a double bearing type fishing reel having a lever type drag mechanism, and capable, owing to the omission of the above-mentioned spool-supporting ball bearings, of reducing the number of parts of the reel, simplifying the construction of the reel, and improving the casting performance of the reel by reducing the inertial force occurring while the spool is rotated freely.

A third object of the present invention is to provide a double bearing type fishing reel having a lever type drag mechanism, having a low rotational friction resistance and capable of rotating a handle lightly owing to the use of not many but only one radial ball bearing which generates thrust.

The above and other objects as well as advantageous features of the invention will become apparent from the following description of the preferred embodiments taken in conjunction with the accompanying drawings.

DESCRIPTION OF THE PREFERRED EMBODIMENTS

Figure 1:
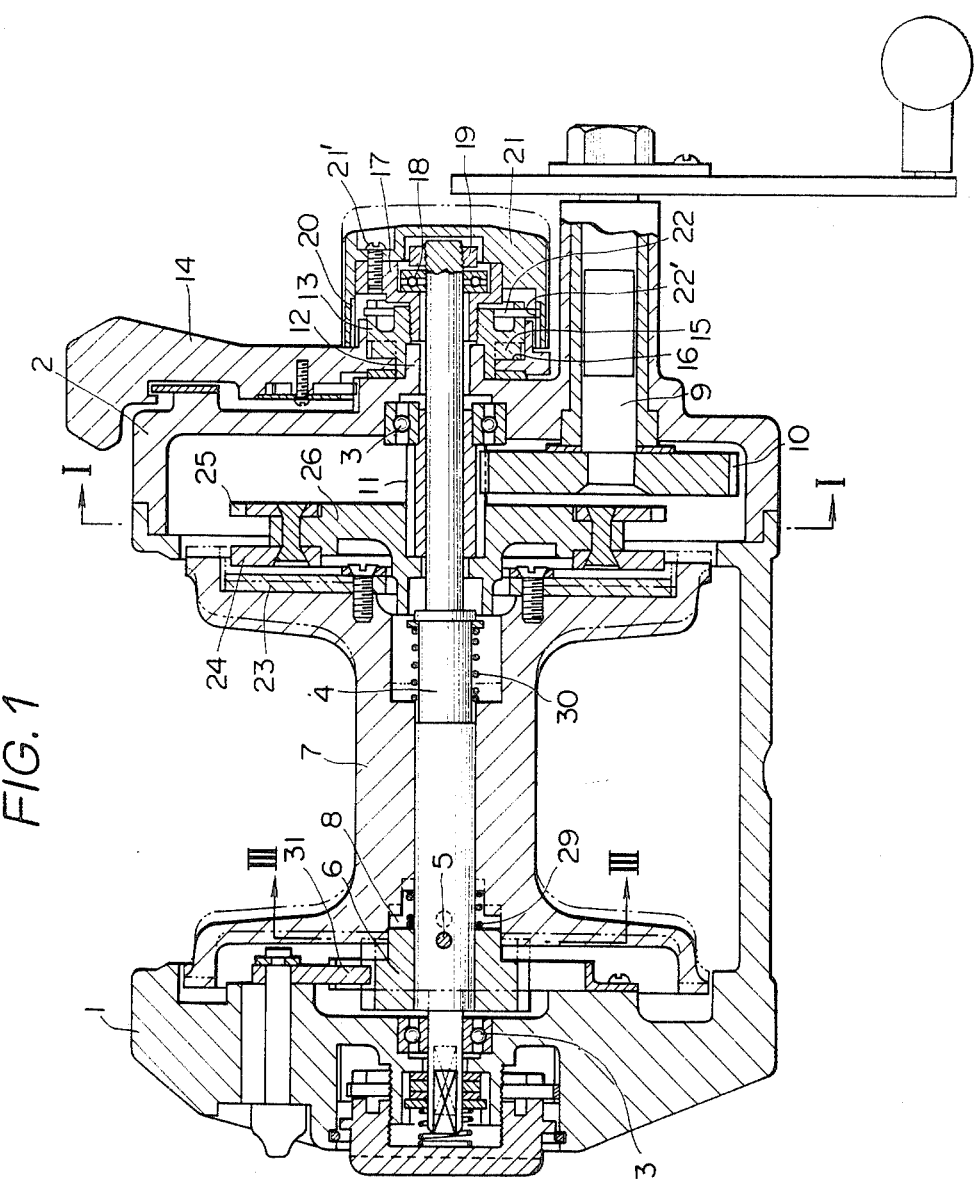
FIG. 1 is a sectioned front elevation of the present invention.
Figure 2:
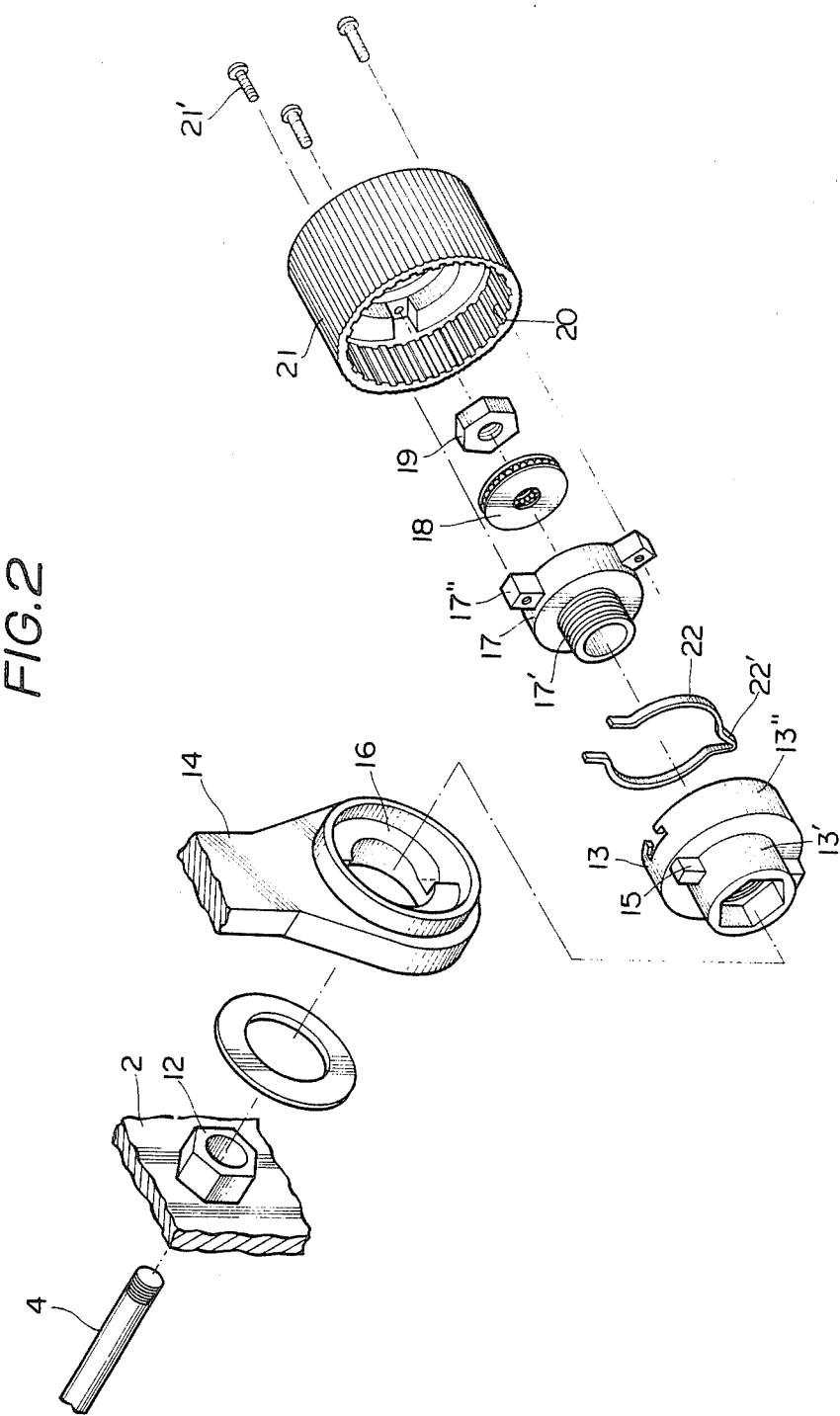
FIG. 2 is an exploded view in perspective of the principal portion of the present invention.

The embodiments of the present invention will now be described with reference to the drawings. A spool shaft 4 is supported on side members 1, 2 of a reel via radial bearings 3. A rotation-preventing member 6 fixed by a setting pin 5 to the portion of the spool shaft 4 which is on theside of the side member 1 is engaged with a locking bore 8, which is formed in one side portion of a spool 7 mounted on the spool shaft 4 so that the spool 7 can be axially moved, to thereby combine the spool 7 with the spool shaft 4 so that the spool 7 and spool shaft 4 cannot be turned with respect to each other.

A pinion 11 meshed with a driving gear 10 mounted on a handle shaft 9 is mounted rotatably on the portion of the spool shaft 4 which is on the inner side of the radial bearing 3 on the side of the side member 2. An end portion of the spool shaft 4 projects to the outer side of the side of the side member 2. A stepped shaft member 12 is formed integrally with the outer portion, which corresponds to the projecting portion of the spool shaft 4, of the side member 2 so that the shaft member 12 projects outward therefrom. A slidable member 13 is fitted in an annular recess in the outer circumferential surface of the stepped shaft member 12 so that the slidable member 13 can be moved in the axial direction.

The slidable member 13 is formed of a smaller-diameter tubular portion 13' engaged with the stepped shaft member 12, and a larger-diameter tubular portion 13" made on the outer side of and integrally with the smaller-diameter tubular portion 13'. A drag-operating lever 14 is fitted around the outer circumferential surface of the smaller-diameter tubular portion 13' so that the lever 14 can be turned freely. An operating projection 15 provided on the section of the smaller-diameter tubular portion 13' which is on the inner side of the larger-diameter portion 13" is formed so that the projection 15 contacts a cam surface 16 provided on the outer side surface of the drag-operating lever 14. When the drag-operating lever 14 is turned, the slidable member 13 can be moved outward via the operating projection 15 owing to the cam surface 16.

A threaded cylinder 17' projecting from a knob retainer member 17 is engaged with the inner section of the larger-diameter portion 13" of the slidable member 13, and the portion of the spool shaft 4 which extends through and projects outward from the knob retainer member 17 is provided thereon with a thrust bearing 18 and a locking nut 19 in the mentioned order. A drag regulating knob 21 having teeth 20 on the inner circumferential surface thereof is fixed by setting screws 21' to mounting portions 17" projecting from the outer circumferential surface of the knob retainer member 17, and a central projecting portion 22' of a one-point-split annular spring 22 which is engaged with the larger diameter tubular portion 13" of the slidable member 13 is engaged with one of the teeth 20.

Figure 3:
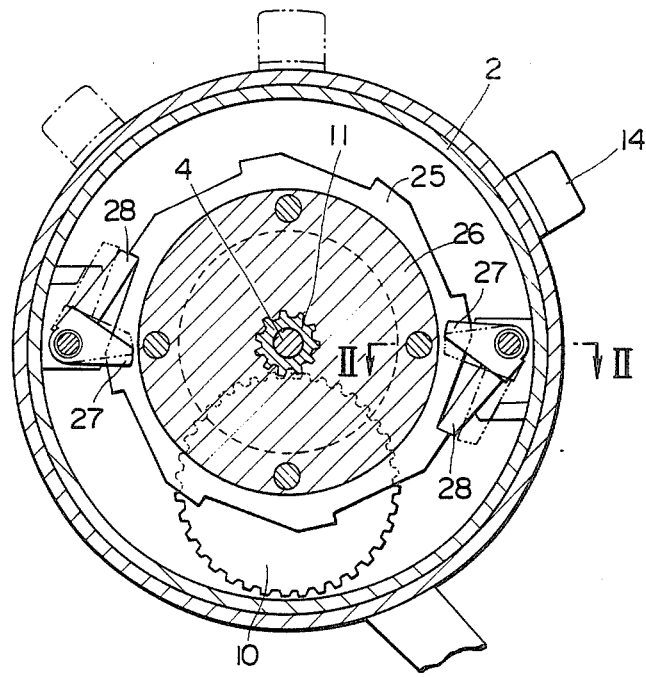
FIG. 3 is a sectional view taken along the line I—I in FIG. 1.
Figure 4:
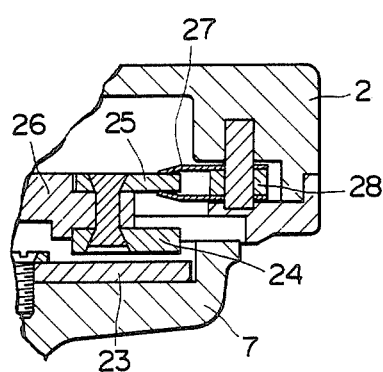
FIG. 4 is a sectional view taken along the line II—II in FIG. 3.
Figure 5:
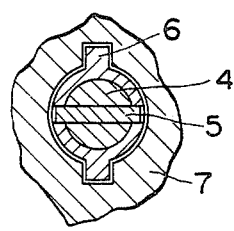
FIG. 5 is a sectional view taken along the line III—III in FIG. 1.

A brake plate 23 is fixed to the side surface, which is on the side of the side member 2, of the spool 7, and a drag disc 26 provided on the inner side thereof with a contact plate 24 opposed to the brake plate 23, and on the outer side thereof with a ratchet 25 is engaged with the pinion 11 so that the drag disc 26 can be turned unitarily. Stoppers 28 joined pivotably to the side member 2 and provided with clamp members 27 for holding the ratchet 25 is formed so that the stoppers 28 can engage and disengage from the ratchet 25. When a force for turning the drag disc 26 counterclockwise in FIG. 3 occurs due to the clamping effect of the clamp members 27 with respect to the ratchet 25, the stoppers 28 engage the teeth of the ratchet 25 to prevent the ratchet 25 from being turned reversely. When the ratchet 25 is turned clockwise, the stoppers 28 disengage therefrom.

Springs 29, 30 are fitted around the portions of the spool shaft 4 which are on both sides of the spool 7. The spring 29 is made stronger than the spring 30 and works so as to maintain the same drag-regulating range, while the spring 30 works so as to separate the brake plat 23 from the contact plate 24 when the drag-operating lever 14 is moved back. Reference numeral 31 denotes a click locking pawl engaged with a toothed portion formed on the outer circumferential surface of the rotation-preventing member 6.

The embodiment of the present invention is constructed as described above. In order to rewind a fishing line, the handle shaft 9 is turned to drive the drag disc 26 via the driving gear 10 and pinion 11. Consequently, the spool 7 is turned via the brake plate 23 whihc is in pressure contact with the contact plate on the drag disc 26, to thereby take up the fishing line around the spool 7. In order to regulate the drag braking force, the drag-operating lever 14 is turned, so that the cam surface 16 thereof presses the operating projection 15 of the slidable member 13 in accordance with the angle of the pivotal movement of the lever 14 to move the slidable member 13 in the outward direction. Consequently, the knob retainer member 17 which is engaged unitarily with the slidable member 13 is also moved outward to draw the spool shaft 4 rightward, i.e., outward via the thrust bearing 18 and locking nut 19. As a result, the springs 29, 30 contract to cause the brake plate 23 on the spool 7 to be pressed against the contact plate 24, and the spool 7 is dragbraked in accordance with the degree of the pressing force of the brake plate 23.

The setting of the drag braking force regulating range is done by turning the drag regulating knob 21 so as to regulate the position of the knob retainer member 17 with respect to the slidable member 13, and the quantity of the forward and backward movements, which are based on the cam effect, of the spool shaft 4 is regulated via the thrust bearing 18 and locking nut 19.

Figure 6:
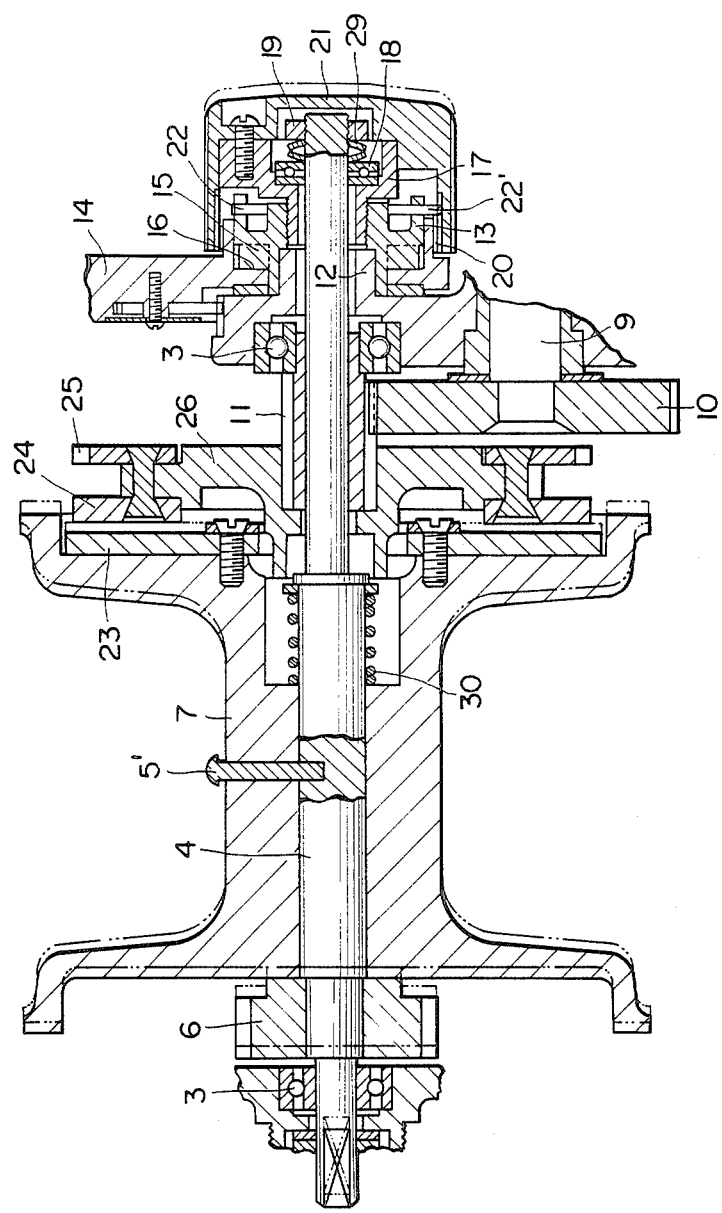
FIG. 6 is a sectioned front elevation of another embodiment of the present invention.

In the above embodiment, the spool 7 is combined with the spool shaft 4 so that the spool 7 is axially slidable but not rotatable. In an embodiment shown in FIG. 6, a spool 7 and a spool shaft 4 are fastened to each other unitarily and directly by a pin 5'. In this embodiment, a spring 29 is inserted between a thrust bearing 18 and a locking nut 19.

In the above-described embodiments, the slidable member 13 is moved axially by the operation of the cam on the drag-operating lever 14. The drag-operating lever 14 may be screwed to the slidable member 13, and the screwing effect due to the pivotal movement of the drag-operating lever 14 may be utilized to slidingly move the slidable member 13 in the axial direction and thereby enable the spool shaft to be axially moved. In the previously-described embodiments, the ratchet 25 is provided on the drag disc 26 to prevent the handle shaft 9 from being turned reversely. This ratchet 25 may also be mounted on the handle shaft 9 as in a conventional fishing reel.

According to the present invention, a lever type drag mechanism for a double bearing type fishing reel is formed so that a spool is combined with a spool shaft directly and unrotatably without using ball bearings. Accordingly, the diameter of a fishing line-winding portion of the spool can be reduced to a low level, so that an increase, which constitutes the fault of a conventional lever type drag mechanism, in the dimensions and weight of the spool and reel can be prevented. Namely, a fishing reel having small dimensions and weight and a large fishing line-winding capacity can be obtained. Since the fishing reel according to the present invention does not require such ball bearings that are provided in a conventional fishing reel, the number of parts can be reduced, and the construction of the fishing reel can be simplified. The success in the reduction of the diameter of the fishing line-winding portion of the spool enables the reduction of the inertial force occurring while the spool is turned freely, and the improvement of the casting performance of the reel. Moreover, since only one radial ball bearing on which a thrust works is provided, the rotational friction resistance is low, and the handle can be turned lightly. The present invention has such excellent characteristics and practicality.

The present invention is not, of course, limited to the above embodiments; it may be modified in various ways within the scope of the appended claims.

What is claimed is:

1. A double bearing type fishing reel comprising a spool shaft supported rotatably between opposed side members of said reel, a spool fitted around said spool shaft, a rotation-preventing member mounted fixedly on said spool shaft and engaged movably in the axial direction with a locking bore formed in one side surface of said spool, to thereby combine said spool with said spool shaft so that said spool and said spool shaft are not turned with respect to each other, a locking member mounted fixedly on an end portion of said spool shaft, which spool shaft with said end portion projects outward from one of said side members, a drag-operating lever supported pivotably on a portion of said side member from which said spool shaft projects outward, said drag-operating lever having a cam surface, a slidable member movable on said spool shaft in the axial direction by said cam surface formed on said drag-operating lever, a knob retainer member which moves said locking member via said slidable member to pull the spool shaft to protrude from the respective side member of the reel, a handle shaft with a driving gear for rotation, a pinion mounted rotatably on said spool shaft and meshed with said driving gear on said handle shaft, a drag disc adapted to be turned unitarily with said pinion, and a brake member provided on a side surface of said spool so as to oppose and be operatively engaged by said drag disc when said handle shaft is rotated.

* * * * *